United States Patent [19]

Weyer

[11] Patent Number: 5,164,751

[45] Date of Patent: Nov. 17, 1992

[54] MEANS FOR INSTANTANEOUS REVIEW OF PHOTOGRAPHIC PICTURES

[76] Inventor: Frank M. Weyer, 81 Toilsome Ave., Norwalk, Conn. 06851

[21] Appl. No.: 531,093

[22] Filed: May 31, 1990

[51] Int. Cl.⁵ .................... G03B 29/00; H04N 5/76
[52] U.S. Cl. .................................... 354/76; 358/906
[58] Field of Search ............. 354/76, 289.1; 358/906, 358/909, 240

[56] References Cited

U.S. PATENT DOCUMENTS

| | | | |
|---|---|---|---|
| 3,699,587 | 10/1972 | Currie | 354/76 |
| 3,733,435 | 5/1973 | Chodil et al. | 358/240 |
| 3,872,462 | 3/1975 | Lemelson | 354/76 X |
| 4,303,322 | 12/1981 | Someya | 354/75 |
| 4,643,551 | 2/1987 | Ohmori | 354/132 |
| 4,703,305 | 10/1987 | Ayliffe | 340/784 |
| 4,742,369 | 5/1988 | Ishii | 358/906 X |
| 4,769,699 | 9/1988 | Gebauer et al. | 354/75 |
| 4,920,371 | 4/1990 | Kaneko | 354/76 |

Primary Examiner—Michael L. Gellner
Assistant Examiner—Jae N. Noh

[57] ABSTRACT

The present invention comprises means for the instantaneous review of photographs as they are taken by a regular film camera. It comprises four basic components: 1) an image sensor means, preferably comprising a charge-coupled device ("CCD"), that produces a signal corresponding to the image sensed, disposed such that it senses an image corresponding to the image seen by a camera's objective lens; 2) a shutter release sensor means, preferably incorporated it the camera's shutter release, that indicates when a photograph is being taken; 3) an image processor means that processes the signal produced by the image sensor means; and 4) a display means, preferably a liquid crystal display ("LCD"), that displays the image seen by the image sensor means at the time the shutter release sensor means indicated that a photograph was being taken.

10 Claims, 2 Drawing Sheets

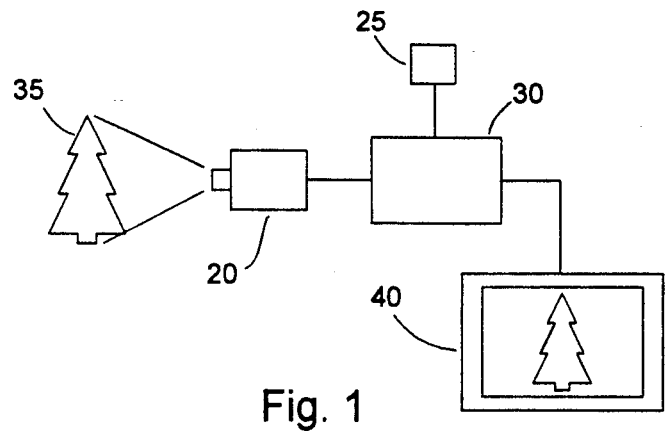
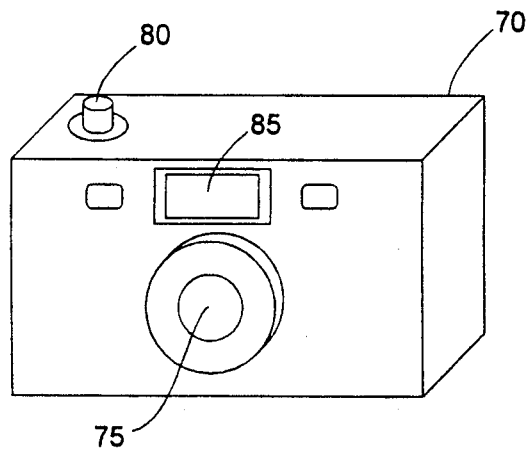
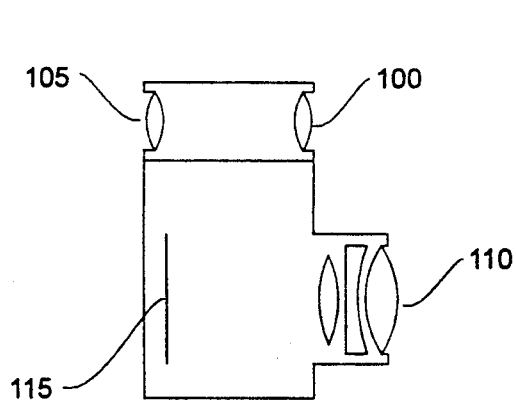
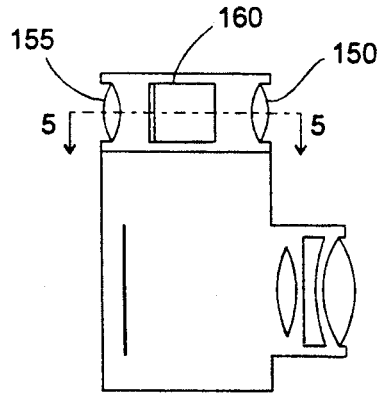
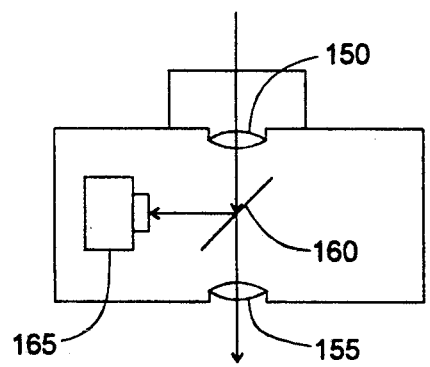

MEANS FOR INSTANTANEOUS REVIEW OF PHOTOGRAPHIC PICTURES

BACKGROUND OF THE INVENTION

There are two basic types of still cameras: instant picture cameras and regular film cameras. Instant picture cameras use special self-developing flims that produce photographic prints shortly after each picture is taken. Regular film cameras use films that must be chemically processed outside of the camera. The instant picture feature of instant picture cameras is convenient in that it produces a nearly immediate image that can be inspected by the photographer and shown to others. Instant picture film is expensive, however, and is available in only a very limited variety of formates, film types and speeds. Instant picture prints are also usually inferior in quality to prints produced from regular film. Instant picture cameras also tend to have fewer features (such as interchangeable lenses) and tend to be bulkier than regular film cameras. Regular film cameras produce superior photographs, can use a great variety of films, and are available in a great number of configurations. They are cheaper to use than instant film cameras, can have a very compact design, and, since regular films generally have a capacity of up to 36 photographs per roll (as compared to the 10 or 12 photograph capacity of instant films), use fewer rolls of film.

Herefore, the one disadvantage regular film cameras have had as compared to instant picture cameras has been their inability to produce instantaneous images that can be reviewed by the photographer for content and/or shown to others.

SUMMARY OF THE INVENTION

The present invention comprises means for the instantaneous review of photographs as they are taken by a regular film camera. It comprises four basic components: 1) an image sensor means, preferably comprising a charge-coupled device ("CCD"), capable of generating a signal corresponding to the image sensed and disposed such that the image sensed corresponds to the image seen by the camera's objective lens; 2) a shutter release sensor means, preferably incorporated in the camera's shutter release, that indicates when a photograph is being taken; 3) an image processor means that processes the signal produced by the image sensor means; and 4) a display means, preferably a liquid crystal display ("LCD"), displays the image seen by the image sensor means at the time the shutter release sensor means indicated that a photograph was being taken. The image sensor means is preferably configured so that it either 1) receives a portion of the actual light transmitted by the camera's objective lens (achieved in a manner similar to the way the image seen by the camera's objective lens is transmitted to the viewfinder in a single-lens reflex ("SLR") camera, or 2) receives light along an axis parallel to the axis of the camera's objective lens (achieved in a manner similar to the way an image approximating that seen through the camera's objective lens is obtained in the viewfinder of a non-SLR or "viewfinder" camera). Fiber optics may also be used to transmit light from the camera's objective lens or viewfinder to the image sensor means.

The components of the invention may be incorporated in the camera itself or may comprise a separate unit attachable to the camera. In its simplest embodiment, the invention displays a low resolution black and white image of a photograph immediately after the photograph has been taken. In a more sophisticated embodiment, the invention display a high resolution color image of the photograph being taken and displays information such as time, aperature, and shutter speed at which the photograph was taken.

BRIEF DESCRIPTION OF THE DRAWINGS

FIG. 1 is a schematic diagram showing the basic components of the present invention.

FIG. 2 is a front perspective view of a auto-focus type camera of the prior art.

FIG. 3 is a simplifed side-sectional view showing the layout of the major optical components of the prior art auto-focus camera of FIG. 2.

FIG. 4 is a simplified side-sectional view showing how the image sensor means of the present invention can be incorporatated in the optical system of the prior art camera shown in FIGS. 2 and 3.

FIG. 5 is a simplified top sectional view of the camera of FIG. 4.

DETAILED DESCRIPTION OF THE INVENTION

Figure 6:
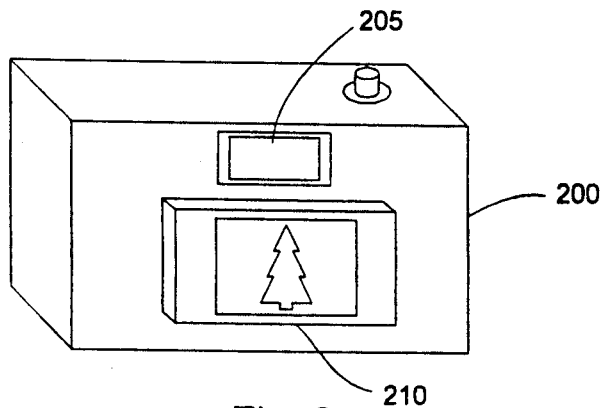
FIG. 6 is a rear perspective view of the display means of the present invention incorporated in the camera shown in FIGS. 4 and 5.

The present invention comprises a means for the instantaneous review of the photographs being taken by a regular film camera. The basic functional components of the present invention are illustrated in schematic form in FIG. 1. These basic components comprise an image sensor means 20, a shutter release sensor means 25, an image processor means 30, and an image display means 40. Although these components are shown as separate, discrete elements in FIG. 1, it should be understood that any two of more of them can combined.

Image sensor means 20 consists of any means capable of generating a signal corresponding to the image sensed by the image sensor means. Preferably, the image sensor means 20 comprises a charge coupled device ("CCD"). CCD's are well known in the art and are commonly used in videotape cameras. The simplest CCD's generate low resolution, black and white video signals. More sophisticated CCD's can generate high resolution, color video signals. In its simplest and therefore least expensive embodiment the present invention utilizes a low resolution, black and white CCD. As described in greater detail below, the image sensor means is mounted in or adjacent to the camera such that the image viewed by the image sensor means corresponds to the image seen through the objective lens of the camera. In FIG. 1, for purposes of illustration, tree 35 represents this image.

Shutter release sensor means 25 comprises means that signals when the shutter of a camera is being released, i.e. the moment when a photograph is being taken. Many prior art cameras already incorporate a flash triggering switch that is used to trigger a flash unit when photographs are being taked in low-light conditions. The shutter release sensor means 25 preferably comprises a switch means similar to the flash triggering switch of prior art cameras, but depending on the configuration of the specific camera with which the present invention is used, the shutter release sensor means may take a different form.

Image processor means 30 comprises means for receiving and storing the signal generated by the image sensor means at the time a photograph is being taken, as signaled by the shutter release sensor means 25, and converting it, if necessary, to a signal that can be displayed on the display means 40. Preferably, image processor means 30 comprises digital solid state image processing and memory components that are well known in the art.

Image display means 40 comprises a screen on which an image corresponding to the signal received from the image processor means 30 can be displayed. Preferably, image display means 40 comprises a flat LCD video display screen, as is well known in the art. Depending on the specific embodiment of the invention, high resolution, low resolution, color, black and white, back-lit or non-back-lit LCD or other types of displays may be used. Image display means 40 may also comprise inherent memory characteristics (i.e. once a signal is sent to the image display means 40, the resulting image will remain displayed until a new signal is received), in which case the image processor means 30 need not comprise seperate memory means.

The operation of the present invention can thus be summarized as follows. When a photograph is being taken by the camera, the shutter release sensor means is triggered. The signal generated by the image sensor means at this instant is sent to the image processor means, where the signal is stored and/or sent to the image display means. The display means, in turn, displays the image which corresponds to the photograph that has just been taken.

FIGS. 2 to 11 illustrate examples of how the present invention can be incorporated in different types of photographic cameras.

One type of camera that is currently very popular is the compact 35 mm auto-focus camera. FIG. 2 is a simplified illustration of a typical 35 mm auto-focus camera. It basically comprises a compact rectangular housing 70 with a front-mounted objective lens 75 and a top mounted shutter release button 80. A separate viewfinder 85 is mounted above objective lens 75.

The layout of the viewfinder and the objective lens of the camera illustrated in FIG. 2 is shown more clearly in FIG. 3. The objective lens 110 comprises a lens system that can be mechanically focussed to create an image of the object being photographed on film plate 115. The viewfinder comprises a front lens element 100 and a rear lens element 105 (either of which, depending on the design of the camera, may be planar, concave, convex, or have a compound shape) mounted above the objective lens 110. The size and optical characteristics of lens elements 100 and 105 are chosen such that the field of view seen through the viewfinder approximates that projected by the objective lens 110 onto film 115. Because the viewfinder is not precisely coaxially in line with the objective lens, the image seen through the viewfinder has a slightly different perspective than the image projected by the objective lens. Except with respect to objects situated very close to the camera, however, the difference is for all practical purposes insignificant.

FIGS. 4 and 5 show how the image sensor means of the present invention can be incorporated into the camera shown in FIGS. 2 and 3 such that the image viewed by the image sensor means is the same as that seen through the viewfinder, and hence, for all practical purposes, the same as that seen through the camera's objective lens. A beam splitter 160 is mounted between front and rear lens elements 150 and 155 respectively. As shown in FIG. 5, beam splitter 160 is mounted such that a first portion of the light entering through front lens element 150 is transmitted through to rear lens element 155, while the remaining portion is reflected towards an image sensor means 165 mounted adjacent to the beam splitter along a line perpendicular to the centerline passing through front and rear lens elements 150 and 155. The image seen by the image sensor means 165 and the image seen through the viewfinder are therefore identical.

Of the other elements of the invention, the image processor means and the shutter release sensor means are preferably contained inside the camera housing, while, as shown in FIG. 6, the display means 210 is preferably mounted on the back side of camera housing 200 centrally positioned below viewfinder 205. Some prior art camera's already contain a small LCD display at this position that displays information such as the time and data that a photograph is being taken. The image display means of the present invention may be configured so as to perform a similar function as well as functioning as the image display means of the present invention.

Figure 8:
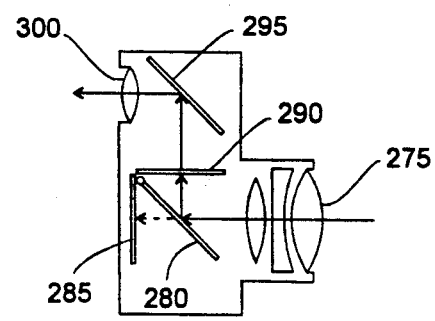
FIG. 8 is a simplified sectional view showing the layout of the optical components of the prior art SLR camera of FIG. 7.
Figure 7:
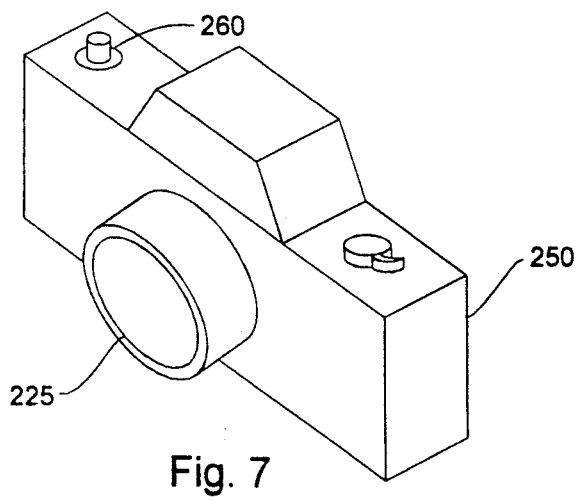
FIG. 7 is a front perspective view of a typical SLR camera of the prior art.

The second common type of prior art camera, namely a "single lens reflex" or "SLR" camera is shown in FIGS. 7 and 8. From the outside, as shown in FIG. 7, an SLR looks similar to the auto-focus camera shown in FIG. 2, having a generally rectangular housing 250, a front mounted objective lens 255, and a top-mounted shutter release button 260. The major difference is the configuration of the viewfinder: in an SLR camera, instead of there being a separate lens system for the viewfinder, the objective lens works as the lens for the viewfinder as well. As shown in FIG. 8, a hinged mirror 280 is mounted between objective lens 275 and film plate 285. A frosted glass screen 290 is mounted vertically above hinged mirror 280 such that the distance from the center of the mirror to the screen 290 is the same as the distance from the center of the mirror to the front surface of film plate 285. A second mirror 295 is fixedly mounted above screen 290, and an eyepiece 300 is mounted at the rear of the camera housing such that by looking through the eyepiece 300 a viewer will see the image projected on screen 290 by objective lens 275 and hinged mirror 280. To take a photograph, the photographer looks through eyepiece 300 and positions the camera and focusses objective lens 275 such that the image of which a photograph is desired is visible and in focus on screen 290. As the shutter release button is activated to take a photograph, hinged mirror 280 pivots along its back edge up and out of the optical path from objective lens 275 to film plate 285. The image that was focussed on screen 290 is now focussed on film plate 285. A shutter mechanism, not illustrated in FIG. 8 for the sake of simplicity, located between hinged mirror 280 and film plate 285, regulates the amount of light striking film 285. After the shutter has been released, hinged mirror 280 swings back down into its original position, and the image seen through objective lens 275 is once projected on screen 290 and visible through eyepiece 300.

The advantage of the viewfinder system used in an SLR camera is that the image seen through the viewfinder is nearly exactly the same image that will be projected on the film when the shutter release is activated. In addition to allowing the photographer to check the focus of the photograph being taken, this arrangement also allows interchangable lenses to be used in place of objective lens 275 without the need for making any changes in the viewfinder system.

Figure 9:
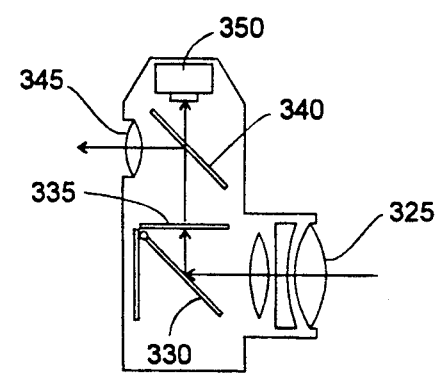
FIG. 9 is a side sectional view showing how the image sensor means of the present invention can be incorporated in the prior art SLR camera shown in FIGS. 7 and 8.

FIG. 9 shows how the image sensor means of the present invention can be incorporated in the viewfinder system of an SLR camera. As in an SLR camera of the prior art, the viewfinder system of the SLR camera incorporating the present invention illustrated in FIG. 9 comprises an objective lens 325, a hinged mirror 330, and a screen 340 onto which the image seen through objective lens 325 is projected. The SLR camera of FIG. 9 also includes an eyepiece 345, but in place of the second mirror of prior art SLR cameras, it uses a beam splitter 340. In addition, image senor means 350 is mounted directly above beam splitter 295. Consequently, one portion of the light coming from screen 335 is transmitted to eyepiece 345 and the other portion to image sensor means 350. In this embodiment of the present invention, the shutter release sensor means is configured such that the image captured on the image display means of the present invention is the image seen through the objective lens 325 of the camera the instant before activation of the camera's shutter release causes the hinged mirror 330 to swing up and out of the way. The image displayed after a photograph has been taken is therefore not exactly the same as the image seen through the objective lens 325 at the moment the shutter is released, but is the image seen through the objective lens 325 a few milliseconds before. Except under unusual circumstances (such as when taking a photograph of race cars or other objects moving at high speed), however, the images will be essentially the same.

Figure 10:
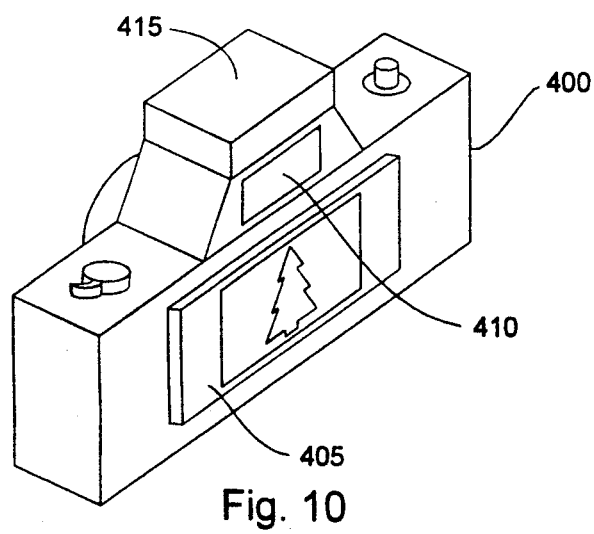
FIG. 10 is a rear sectional view showing how the display means of the present invention can be incorporated in the SLR camera shown in FIG. 9.

FIG. 10 shows the outside of one embodiment of an SLR camera incorporating the present invention. The only differences between the SLR camera shown in FIG. 10 and a typical SLR camera of the prior art is the addition of image display screen means 405 disposed on the rear of housing 400 below viewfinder 410 and an additional bulge 415 (comprising the image sensor means) disposed above viewfinder 410.

Figure 11:
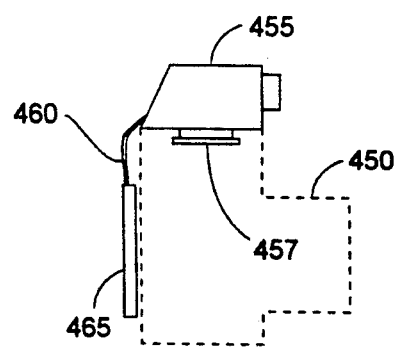
FIG. 11 is a side view of an embodiment of the present invention comprising an add-on system that can be mounted to cameras of the prior art.

Finally, FIG. 11 shows an embodiment of the present invention which may be used with existing prior art camera's utilizing a "hot-foot" 457 flash mount without any internal modification of the prior art camera. In this embodiment, the present invention comprises a image sensor module 455 which comprises a standard hot-shoe that mounts to a standard hot-shoe mount generally located on the top of a prior art camera's housing (shown in outline form as item 450 in FIG. 11) and an image display module 465 mounted by means of pressure adhesive or other suitable means to the back of housing 450 and connected to image sensor module 455 by ribbon cable 460. Ribbon cable 460 allows the back of the camera to be opened for changing film without having to remove image sensor module 455 or image display module 465 (Alternatively, image display module 465 may be pivotably hung from image sensor module 465 such that it can pivot up and out of the way when the camera back is opened). Preferably, image sensor module 455 comprises both the image sensor means and the image processing means of the present invention, while the image display module comprises the image display means. However, all or a portion of the image processor means may be incorporated into the image display module. Since the hot-shoe is activated when the camera's shutter is released, the hot-shoe itself functions as a shutter release sensor means and no additional shutter release sensor means is required. To allow the use of a flash with this embodiment of the present invention, the image sensor module preferably also contains a hot-shoe mounting bracket, electrically connected to the hot-shoe mounting bracket of the prior art camera to which the image sensor module is mounted. The image sensor module may also contain a miniature zoom lens that allows the field of view of the image sensor means to be adjusted to correspond to the field of view of the camera's objective lens, allowing the use of the present invention with a variety of cameras and lenses.

The above illustrations comprise but a few examples of the various possible embodiments and configurations of the present invention. Additional embodiments and configurations will be apparent to those skilled in the art.

I claim:

1. Image review means for displaying an image corresponding to a photograph taken by a camera having an objective lens means, a back, a first flash mount means, and a first flash triggering means, said image review means comprising:
   flash mount attachment means for removably attaching said image review means to the first flash mount means of the camera;
   image sensor means capable of generating a signal corresponding to an image sensed by said image sensor means, said image sensor means orientable such that the image sensed corresponds substantially to the image seen through the objective lens means of the camera; and
   image display means capable of displaying an image corresponding to the signal generated by the image sensor means at the time the first flash triggering means of the camera is activated.

2. The image review means of claim 1 further comprising memory means capable of storing a signal corresponding to the signal generated by the image sensor means at the time the first flash triggering means of the camera is activated.

3. The image review means of claim 1 wherein the image display means comprises a liquid crystal display means.

4. The image review means of claim 1 wherein the image display means is moveably connected to the image sensor means.

5. The image review means of claim 4 wherein the image display means is connected to the image sensor means by a ribbon cable means.

6. The image review means of claim 4 wherein the image display means is removably attachable to the back of said camera.

7. The image review means of claim 4 wherein the image display means is pivotably connected to the image sensor means.

8. The image review means of claim 1 wherein the image sensor means further comprises miniature zoom lens that allows a field of view of the image sensor means to be adjusted to correspond to a field of view of the objective lens means of the camera.

9. The image review means of claim 1 further comprising second flash mount means allowing a flash to be mounted to the image review means and second flash triggering means for triggering a flash mounted to said second flash mount means when said first flash triggering means of said camera is triggered.

10. The image review means of claim 1 wherein the image display means comprises inherent memory characteristics such that it is capable of displaying and retaining an image corresponding to the signal generated by the image sensor means at the time the first flash triggering means of the camera is activated.

* * * * *